US006601985B1

(12) United States Patent
Jesurun et al.

(10) Patent No.: US 6,601,985 B1
(45) Date of Patent: Aug. 5, 2003

(54) MEDICAL LIGHTING SYSTEMS USING ELECTRODELESS METAL HALIDE LAMPS AND FIBER OPTIC LIGHT PIPES

(75) Inventors: David Jesurun, South Euclid, OH (US); Victor Selig, Euclid, OH (US); Yury Keselman, Beachwood, OH (US)

(73) Assignee: Steris Inc., Temecula, CA (US)

(\*) Notice: Subject to any disclaimer, the term of this patent is extended or adjusted under 35 U.S.C. 154(b) by 118 days.

(21) Appl. No.: 09/603,141

(22) Filed: Jun. 23, 2000

Related U.S. Application Data
(60) Provisional application No. 60/141,020, filed on Jun. 25, 1999.

(51) Int. Cl.$^7$ .................................................. A61B 1/06
(52) U.S. Cl. ...................... 362/572; 362/552; 362/804; 362/573; 362/576
(58) Field of Search ............................. 362/576, 572, 362/551, 33, 804, 573, 97, 147, 148, 149, 150, 227, 228, 229–252

(56) References Cited

U.S. PATENT DOCUMENTS

| | | | | | |
|---|---|---|---|---|---|
| 3,437,803 A | * | 4/1969 | Seitz et al. | ..................... | 362/32 |
| 5,038,254 A | * | 8/1991 | Fabbri et al. | ................. | 362/33 |
| 5,160,193 A | * | 11/1992 | Fabbri et al. | ................. | 362/33 |
| 5,497,295 A | * | 3/1996 | Gehly | .......................... | 362/32 |
| 5,526,245 A | * | 6/1996 | Davis et al. | ................. | 362/233 |
| 5,539,626 A | * | 7/1996 | Scholz | ........................ | 362/249 |
| 5,613,758 A | * | 3/1997 | Kamschal et al. | ........... | 362/146 |
| 5,639,153 A | * | 6/1997 | Bibiani et al. | ................. | 362/32 |
| 5,803,905 A | * | 9/1998 | Allred et al. | ................ | 600/249 |
| 5,873,644 A | * | 2/1999 | Roessner et al. | .............. | 362/32 |
| 6,039,377 A | * | 3/2000 | Eberspacher | ............... | 296/24.1 |
| 6,132,062 A | * | 10/2000 | Boerders et al. | ............ | 362/251 |
| 6,464,383 B1 | * | 10/2002 | Northington et al. | ....... | 362/572 |

FOREIGN PATENT DOCUMENTS

DE 2854684 * 12/1978 .................. 362/804

\* cited by examiner

Primary Examiner—Sandra O'Shea
Assistant Examiner—Anabel Ton
(74) Attorney, Agent, or Firm—Fay, Sharpe, Fagan, Minnich & McKee, LLP

(57) ABSTRACT

A medical lighting system is provided using electrodeless metal halide lamps and fiber optic light pipes to provide illumination to a plurality of medical appliances from a remote light source. In a first embodiment, multiple surgical lightheads and light utility outlets are illuminated from a remote lighting source. The single light source is further used in conjunction with multiple surgical lightheads, light utility outlets, and surgical task lights in operating or examination rooms. In a further embodiment, a remote metal halide lamp provides task lighting to an examination room in combination with standard incandescent ambient lighting. In further embodiments, multiple operating and/or examination rooms are supported by a single remote light source. By locating the light source remote from the end light consumers and providing optical fibers therebetween reduced size, heating, and other benefits are enabled in medical examination or operating rooms.

20 Claims, 6 Drawing Sheets

MEDICAL LIGHTING SYSTEMS USING ELECTRODELESS METAL HALIDE LAMPS AND FIBER OPTIC LIGHT PIPES

CROSS-REFERENCE TO RELATED APPLICATION

This application claims the benefit of U.S. Provisional Application Ser. No. 60/141,020 filed Jun. 25, 1999.

BACKGROUND OF THE INVENTION

Traditional surgical lighting systems include at least one but usually two or more incandescent lamps disposed in large ceiling supported luminaries. The incandescent bulbs generate large quantities of good quality light. Generally, a color rendering index (CRI) is used as a relative measure of how well an object will be recognized under the light. The incandescents have a good CRI. The need for a high color rendering index is especially acute during surgical procedures because the look and color of the illuminated tissue often provides surgeons with critical visual feedback information. Over the years, complicated reflector and lensing arrangements have been implemented in the lightheads to provide for shadowless illumination of the surgical site and to enable easy manual adjustment of beam spot size for further enhancing the capabilities of the traditional lighting systems.

Although these prior systems have been somewhat successful in addressing the basic needs of surgeons and are relatively inexpensive, the incandescent lamps or bulbs used impose a serious fundamental performance limitation. More particularly, lighting systems that use incandescent bulbs are notorious for having poor efficiency and short life. They also generate a substantial amount of radiation in the infra-red range. This causes undesirable heat that can potentially damage the tissue below the lighthead.

In commercial and industrial applications, metal halide lamps have been proposed as a substitute for traditional incandescent bulbs because they offer an improved energy efficiency, longer life, and better light to heat ratio. In that technology, a pair of spaced apart electrodes extend into a pressurized chamber that holds liquid/gaseous halide material. An external power source is connected to the pair of spaced apart electrodes to supply a large voltage across the free ends of the electrodes within the chamber. The high voltage causes the halide material mixture to ionize, thereby allowing a small current to pass therethrough. For as long as the current is sustained, a light-emitting plasma discharge is generated within the lamp.

Although metal halide gas discharge lamps typically have the above advantages over incandescent lamps, they have a generally low CRI and sometimes suffer from inadequate color stability and poor lamp-to-lamp color variability. In order to achieve desired performance characteristics, very small amounts of selected caustic compositions are required. The dosing is hard to control and the chemicals often cause seal failure in the lamp and accelerated electrode corrosion.

Color stability is adversely affected in metal halide discharge lamps whenever they are moved during use. This is because as the energized bulbs are subjected to motion, the liquid halide mixture pool within the bulb flows to regions of different temperatures causing the composition of the liquid/gaseous mixture to change. The mounted within the reflector of a ceiling supported luminaire for use in a surgical lighting system. The teachings of that patent are incorporated herein by reference.

Two significant problems with systems that use electrodeless metal halide discharge lamps in conventional lightheads, such as described in the '706 patent, however, are the orientation sensitivity and partial blockage of the light by the electric field coils used to couple electric energy to the liquid/gaseous mixture. Shadow control and field coil physical size requirements become a limiting factor as well. In addition, the bulb generates heat within the lighthead itself which in turn could cause some discomfort to the surgical staff. Large cooling fins are required on the back side of the lighthead to dissipate heat so that the reflector portion is not hot to the touch.

Accordingly, it would be desirable to use the high quality light energy produced from metal halide lamp technology, particularly electrodeless metal halide lamps, in medical and surgical applications. It would be further desirable to utilize light from a metal halide lamp source in surgical applications but without physically locating the lamp within the lighthead. It would therefore be desirable to locate a metal halide light source at a remote area and then port the light through a large collection of fiber optic cables so that the light is conducted/distributed to one or more distant end users.

BRIEF DESCRIPTION OF THE INVENTION

A preferred embodiment of the present invention consists of an electrodeless metal halide lamp coupled in combination with a plurality of fiber optic cables to distribute and deliver light to one or more remote locations, preferably operating rooms, examination rooms, sloshing liquid also adversely affects the corrosion resistance of the electrodes.

Lastly, as noted above, metal halide discharge lamps have an overall poor lamp-to-lamp color variability. In general, the gaseous/liquid mixture contained within the bulb requires very small amounts of critical materials, the proportion of which relative to the overall mixture is hard to control. Therefore, typically, each metal halide discharge lamp has a unique and often very different color spectrum.

In view of the above drawbacks, metal halide discharge lamps have met with little success in surgical lighting systems. The physical size of the bulbs and the heat generated during their operation make it impractical to place metal halide lamps within medical lightheads. Only one known commercial offering, the Martin ML 702 product, uses a metal halide discharge lamp in a conventional surgical luminaire.

Electrodeless metal halide (EMH) lamp technology offers improved performance relative to the above-described standard incandescent and metal halide discharge lamps. These lamps, as their name implies, have no electrodes but, rather, rely on electromagnetic high frequency (radio frequency) power to generate and sustain the light emitting plasma discharge within a lamp capsule. A pair of high frequency coils are disposed on opposite sides of a sealed capsule containing a liquid/gaseous halide mixture. Since the coils are disposed on the outside of the capsule, they are out of physical contact with the halide mixture. This construction directly enables a wider range of chemistry to be used within the bulb and, in turn, leads to the ability to achieve higher life cycles, and higher color rendering index (CRI).

U.S. Pat. No. 5,861,706 describes an electrodeless high intensity discharge lamp physically fixtures within one or more rooms, outlets within one or more rooms, and to centralized light devices within one or more rooms. The light from the fiber optic cables is usable to power, in one or more selected combinations, ambient room lighting, major surgical luminaires, minor examination lights, various light appliances such as surgical head lights, endoscopes, or any other use for medical applications.

Preferably, the light source is an electrodeless metal halide (EMH) discharge lamp arranged in a suitable remote lighting center. A plurality of flexible fiber optic cables are used to communicate and distribute the light energy from the lighting center source to a plurality of lighting fixtures, utility drop points, and other "light consuming" apparatus. The preferred EMH lamp has sufficient power to enable multiple light users to simultaneously access the light through the fiber optic cable bundle at locations remote from the lighting center. For example, the light can be supplied from a distance to multiple rooms or to multiple locations within a hospital.

One aspect of the present invention is that an electrodeless metal halide light source is used within the lighting center, which is in turn remotely disposed relative to the end users. Preferably, the lighting center is positioned far from sterile areas and at a location that helps facilitate regular maintenance and, as a preferred example, in the ceiling or wall. High efficiency fiber optic cables are used as conduits to port the light through ceilings, walls, and various fixture support mechanisms to multiple points of use.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
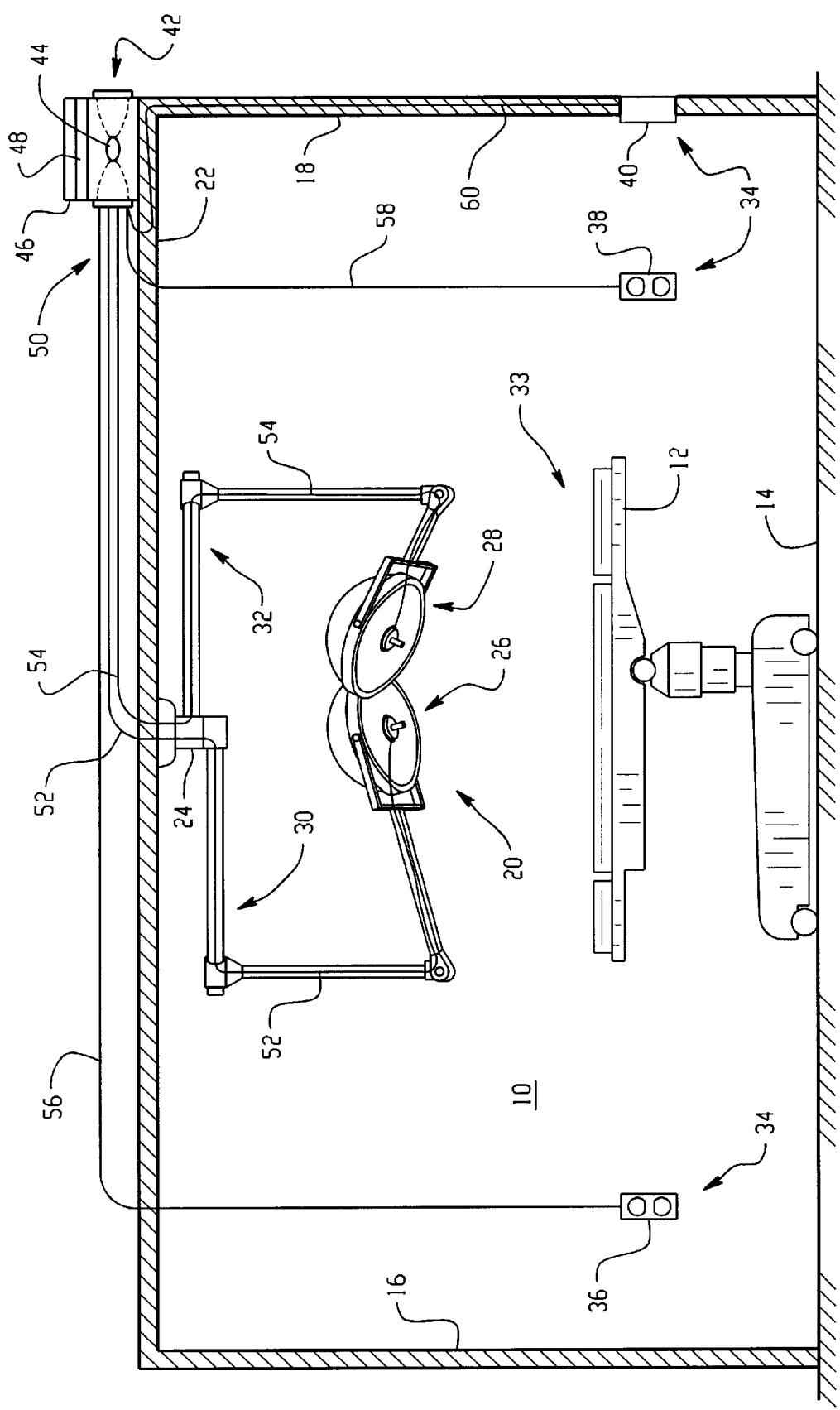
FIG. 1 is a diagrammatic view showing an illumination system formed in accordance with a first preferred embodiment of the invention.

Referring now to the drawings wherein the showings are for the purposes of illustrating the preferred embodiment of the invention only and not for purposes of limiting same, FIG. 1 shows illumination of multiple surgical lightheads and light utility outlets in a single room from a remote EMH lighting source. As illustrated, an operating room 10 is equipped with a surgical table 12 free standing on the floor 14 between left and right walls 16, 18. The table is centered under a surgical lighting system 20 that is supported from the ceiling 22 of the operating room from a central rotary hub device 24. A pair of surgical lightheads 26, 28 are each respectively attached to the rotary hub device 24 through a corresponding set of support arm members 30, 32. The lightheads illuminate a surgical site 33 adjacent the surgical table 12.

In addition to the overhead surgical lighting system 20, the operating room 10 is provided with a "utility" lighting system 34 including a set of wall-mounted light "utility" outlets 36, 38, and 40 preferably arranged in the operating room 10 as shown. The light utility outlets are interfaces adapted to provide mechanical and optical cable end connections for the distribution of light to various devices unable to independently generate light. As preferred examples, the outlets selectively mechanically connect with, and provide light to, surgical headlights, other task lights, endoscopes, light pipes used for internal illumination such as lighted surgical retractors, and the like. Preferably, each of the above-noted auxiliary devices are provided with suitable mechanical and optical latch-type or quick connect/disconnect interfaces for selective ready connection onto the light utility outlets 36, 38, and 40.

Of primary significance to the current invention, both the surgical lighting system 20 as well as the "utility" lighting system 34 derive light energy from a single remote lighting center 42 disposed at a location distant from sterile areas, preferably in the ceiling 22 of the operating room 10 as shown. The lighting center 42 includes one or more metal halide discharge lamps 44, preferably electrodeless, supported above the ceiling of the operating room within a suitable housing member 46. preferably, the housing member 46 includes a mounting unit 48 that has a central body portion adapted to hold the EMH discharge bulb and field coils and is further adapted on one side to hold the free proximal end of a fiber optic cable bundle 50 and to direct the light from the EMH lamp 44, by reflection or otherwise, into the free end of the fiber optic cable bundle 50. The light emitting distal ends of the fiber optic cables are terminated at the surgical lighting system 20 or at the utility lighting system 34.

As shown in the figure, the fiber optic bundle 50 includes several individual light conducting fiber optic cables including a first pair 52, 54 for conducting light from the EMH lighting center 42 to the pair of surgical lightheads 26, 28 substantially as shown. In addition, the fiber optic cable bundle 50 includes a second set of fiber optic cables 56, 58, and 60 for distributing the light from the central remote lighting center 42 to the individual light "utility" outlets 36, 38, and 40, as shown.

Preferably, in accordance with the present invention, the EMH lighting center 42 for each embodiment generates light having the following characteristics:

Lamp Life: >5000 hrs.;
Color Rendering Index: >90;
Color Stability: Excellent;
Lamp-to-Lamp Color Variability: ±200 k; and,
Color Temperature: 4500–6000 k.

One major advantage of the first embodiment of the subject invention and of the other embodiments to be described below is reduced hospital maintenance costs due to the inherent centralized and remote nature of the electrodeless metal halide lighting center. More particularly, all maintenance of the subject system could be performed outside the physical confines of the operating room 10. Accordingly, there would be no need to decontaminate the operating room following maintenance of the lighting center.

Another advantage of the systems described herein is improved color uniformity due to the nature of the single EMH discharge lamp source. To that end, since all of the light that is emitted from the surgical lighting system 20 and the "utility" lighting system 34 is generated from a single EMH source, the color spectrum at each of the surgical lightheads 26, 28 and at each of the light "utility" outlets 36, 38, and 40 are substantially identical.

Another significant advantage of the embodiment illustrated in FIG. 1 and of the other embodiments to be described below is that since the lighting source is disposed in a location remote from the light consumers, the source need not be moved at all, but rather, can be securely affixed at a convenient location within the ceiling, substantially as shown. Thus, the lighting system does not suffer from color stability problems associated with energized metal halide bulbs subjected to motion during use.

In addition, since a single lighting center is provided rather than individualized lighting sources at each of a set of multiple locations within the operating room, the EMH discharge lamp can take on substantially large dimensions and have large light emitting capacities for example between 500/1000 watts. Aggressive cooling of the large lamps does not pose a problem since they reside in a lighting center remote from the one or more surgical sites. Further, the remote lighting center enables the provisions of large backup systems to be used. As an example, a pair of side-by-side lighting centers (not shown) could be coupled to a flexible cable type fiber optic light distribution system through a rigid quartz "Y" connection. In that way, one or the other of the parallel lighting centers on the "Y" end could be enabled as necessary.

In practice, major surgical lighting systems are required to provide automatic backup capability that will restore at least 50% of the original illumination within 5 seconds in the event of a lamp failure. In the present invention using an electrodeless metal halide source coupled to a fiber optic network to deliver light to remote locations, there are many ways this could be accomplished. A backup lamp, preferably identical to the original or primary metal halide bulb, but possibly somewhat different than the original, is provided and started or energized when failure of the primary source is detected. While technically feasible, a fully redundant light distribution system from the source to the end user is highly undesirable due to cost and space constraints. Therefore, the next requirement of the backup system is to efficiently couple light from the new source into the existing fiber optic network.

The present invention contemplates at least three alternative embodiments to accomplish the task of automatic light source backups. The preferred embodiment is a completely passive (non-moving) system that has duplicate optical "Y" couplers or other such devices that are disposed to selectively join two light paths. An alternative is for selected optical components, including possibly mirrors, beam splitters, or the ends of the flexible fiber optics cables to be moved to gather the light from the stationary backup source. Another alternative is for the failed primary source to be mechanically moved out of the way and the backup source moved into its place. Combinations of the above are also contemplated by the present invention. Alternatives in addition to the above can be envisioned by those proficient in the art of light distribution.

Figure 2:
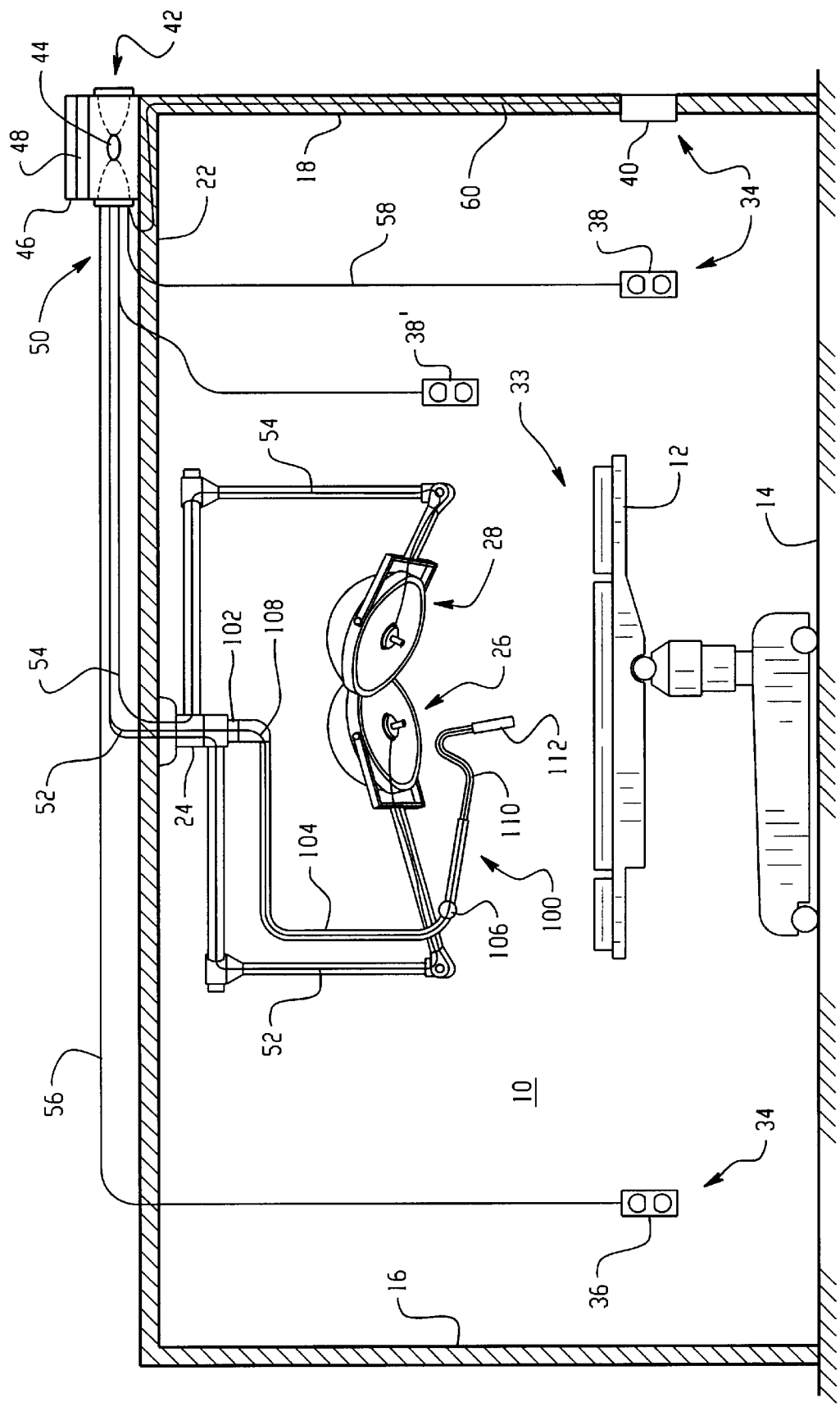
FIG. 2 is a diagrammatic view showing an illumination system formed in accordance with a second preferred embodiment of the invention.

FIG. 2 illustrates a medical lighting system for illumination of multiple surgical lightheads, light utility outlets, and a surgical task light in a single room using a remote electrodeless metal halide lamp and fiber optic light pipes in accordance with a second preferred embodiment of the present invention. A comparison between FIGS. 1 and 2 reveals that the system shown in FIG. 2 is substantially similar to that illustrated in FIG. 1 but with the addition of an auxiliary fiber optic ceiling supported task light system 100. The task light system 100 is provided as an auxiliary lighting system to augment the illumination developed by the first and second surgical lightheads 26, 28. The task light may also be used by itself or in combination with a single surgical lighthead. Preferably, the task light generates a cold beam of light having a spot size between 2 and 6 inches. In FIG. 2 and in the figures that follow, like reference numerals will be used to identify items and/or components that have the same or similar function, performance, or characteristics.

With continued reference to FIG. 2, fiber optic surgical task light system 100 is supported from the ceiling 22 by a mechanical rotary hub member 102 that is connected as shown with the rotary hub device 24 described above. In the embodiment illustrated, the rotary hub member 102 is provided with a suitable opto-mechanical commutator so that the task light system 100 may be rotated continuously about the longitudinal axis L defined by the rotary hub device 24. The hub member 102 freely moves through multiple rotations without any mechanical binding or interference so that the task light 100 supported therefrom can be moved into any desirable orientation.

An elongate L-shaped support member 104 is connected on one end through the mechanical rotary hub member 102 and, on the other end, to a mechanical compound counterbalanced joint member 106. The L-shaped member 104 is substantially hollow to enable an elongate fiber optic cable 108 to be carried therein. In that way, the fiber optic cable is concealed within the L-shaped support member. The fiber optic cable 108 is preferably contained entirely within the L-shaped support member 104, the counterbalanced joint member 106, and the mechanical gooseneck section 110.

The lower portion of the fiber optic task light system 100 includes a manual zoom lens device 112 carried on the flexible gooseneck section 110 which is in turn supported from the mechanical counterbalanced joint member 106 as shown. The support member and the flexible gooseneck section carry the lower portion of the fiber optic cable 108 so that the mechanical zoom lens device 112 can be used to emit light from a distal end thereof onto the surgical site 34. The manual lens 112 carried on the flexible end of the support member enables the selective shaping of the light pattern emitted from the lens into a range of selected patterns, preferably into spot size between 2 and 6 inches.

Figure 3:
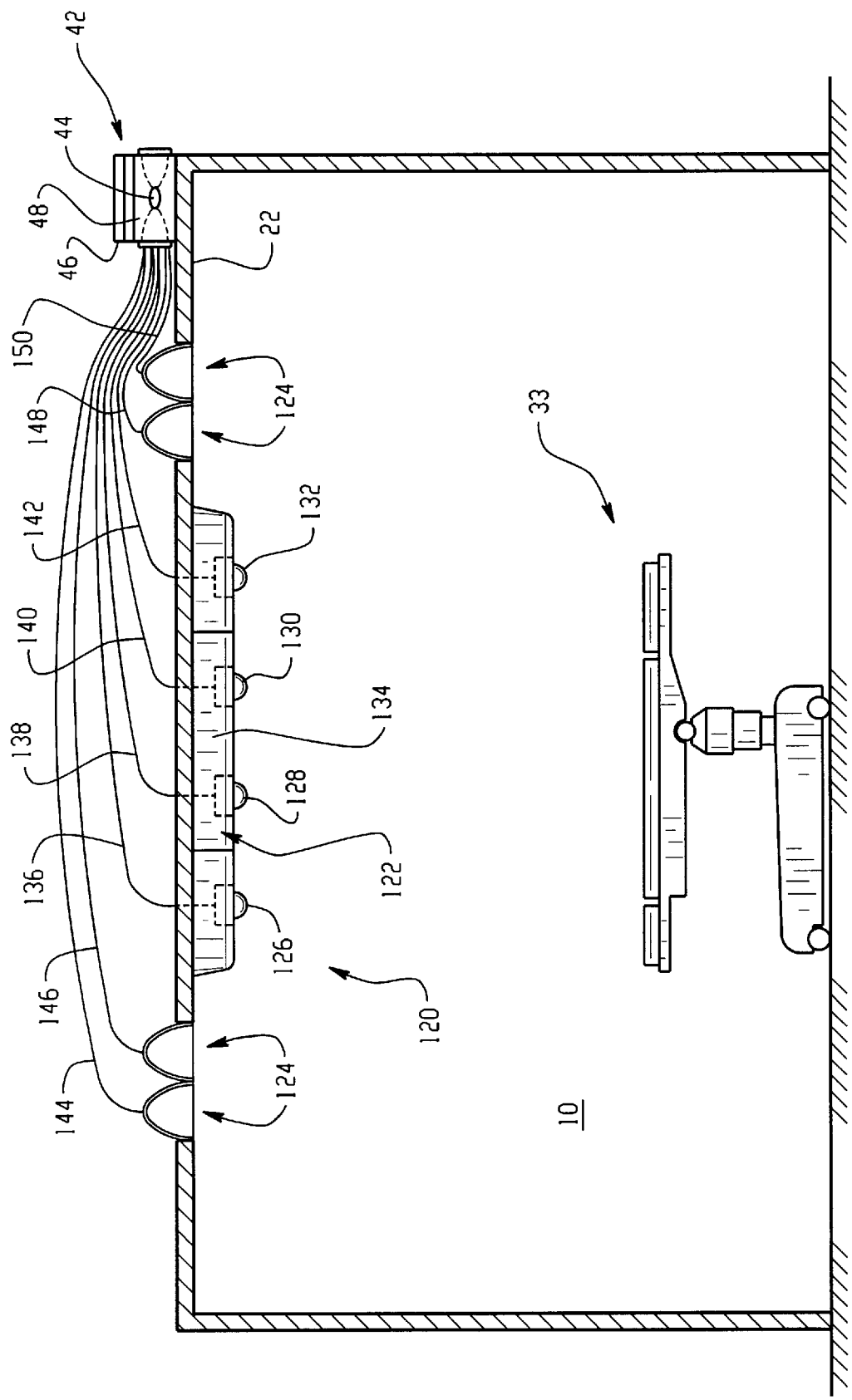
FIG. 3 is a diagrammatic view showing an illumination system formed in accordance with a third preferred embodiment of the invention.

FIG. 3 shows a single room illumination system 120 in accordance with another embodiment of the present invention wherein a single lighting center 42 including at least one electrodeless metal halide discharge lamp 44 is used to supply light power to a surgical ceiling light array 122 for surgical task lighting and to supply light power to a set of ambient light fixtures 124 in the ceiling 22 of a surgical room 10 to completely satisfy the needs of a sophisticated operating room.

As shown for purposes of illustrating the invention only and not for purposes of limiting same, the surgical ceiling light array 122 includes a set of lighting modules 126–132 disposed in a regular arrangement within a ceiling-mounted fixture device 134. Preferably, each of the lighting modules 126–132 are individually movable relative to the ceiling 22 so that light from the surgical ceiling light array 122 can be selectively tailored to meet the needs of procedures that are performed therebelow in the surgical site 33. The lighting modules 126–132 can be formed to be responsive to infrared or radio frequency signals so that each lighting module can be trained onto one or more moving or stationary focal points within the surgical area 33.

With continued reference to FIG. 3, each of the lighting modules 126–132 disposed within the ceiling-mounted fixture device 134 are connected to the lighting center 42 using a set of high efficiency fiber optic cables 136–142 as shown. Preferably, the fiber optic cables 136–142 are arranged overhead and supported relative to the ceiling 22 of the operating room 10.

In addition to the fiber optic cables discussed above, each of the ambient light fixtures 124 is similarly connected to the lighting center 42 using a corresponding set of fiber optic cables 144–150 and suitable lenses and reflectors as shown.

Figure 4:
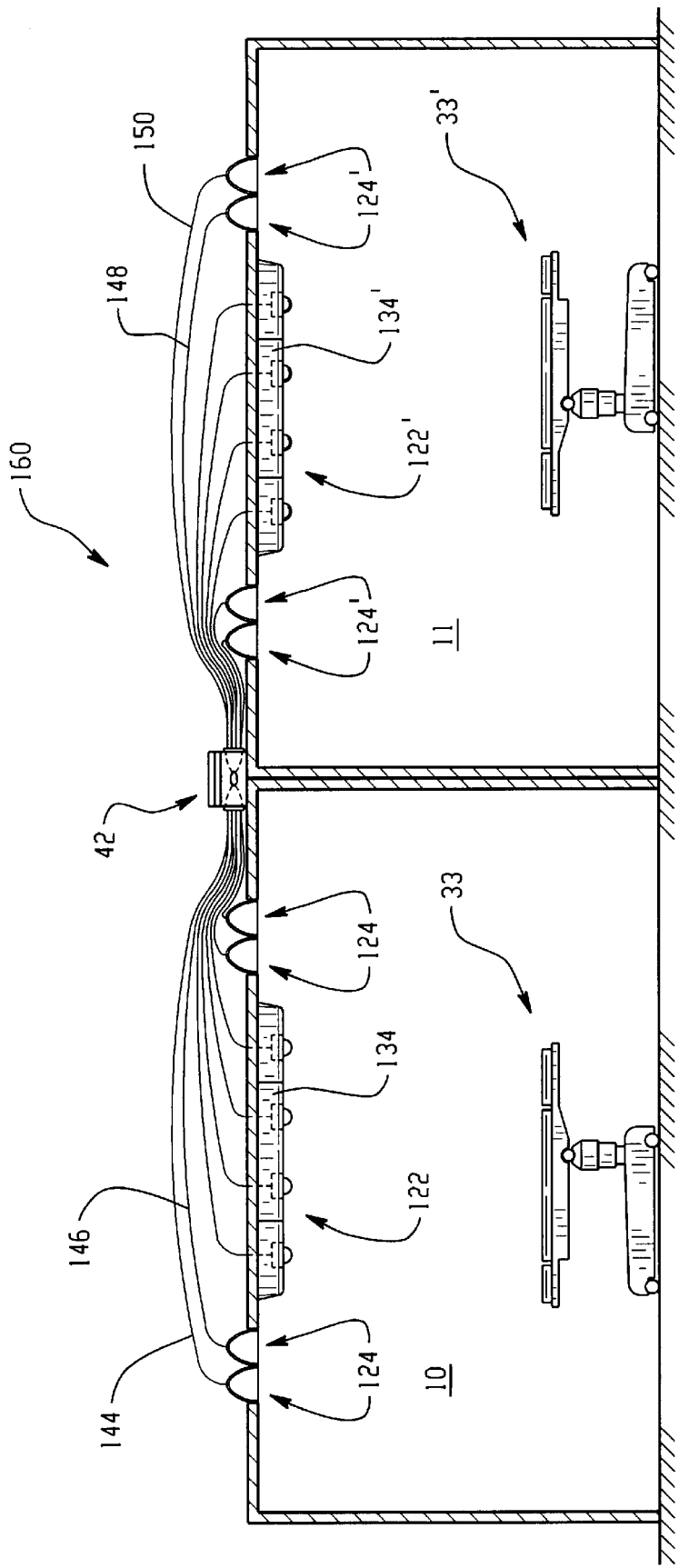
FIG. 4 is a diagrammatic view showing an illumination system formed in accordance with a fourth preferred embodiment of the invention.

With reference next to FIG. 4 illumination of multiple surgical ceiling arrays and ambient lighting fixtures in multiple surgical rooms using an EMH lighting source in accordance with another embodiment of the invention is shown. A multiple room illumination system 160 is illustrated using a single lighting center 42 having one or more electrodeless metal halide discharge lamps 44 contained therein for providing both surgical task lighting and ambient lighting to at least two surgical operating rooms 10 and 11. The system shown in FIG. 4 is substantially similar to the single room illumination system described above in connection with FIG. 3 but with the additional hardware to enable the light power derived from a single centrally located lighting center 42 to be distributed to multiple (at least two) operating rooms. Essentially, the system of lighting fixtures described above in connection with FIG. 3 is duplicated so that each operating room 10, 11 includes at least one surgical ceiling light array 122 and a separate set of ambient light fixtures 124. Only a single lighting center 42 is used.

As described above in connection with the single room illumination system, in the system shown in FIG. 4, each surgical ceiling light array 122 is connected to the lighting center 42 using a set of fiber optic cables 136–142. Similarly, each of the lighting modules for providing ambient light within the surgical rooms are connected to the light center 42 using a corresponding set of fiber optic cables 144–150.

Figure 5:
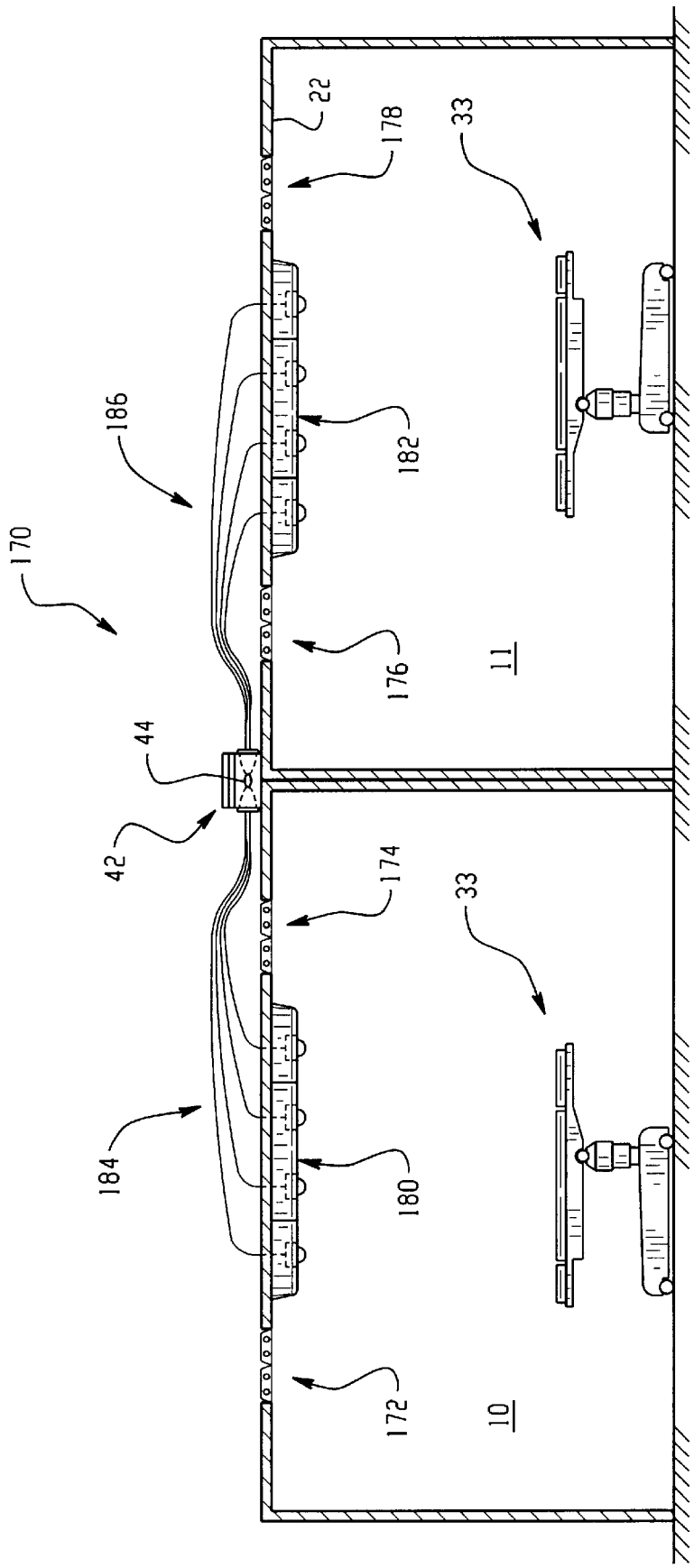
FIG. 5 is a diagrammatic view showing an illumination system formed in accordance with a fifth preferred embodiment of the invention; and, FIG. 6 is a diagrammatic view showing an illumination system formed in accordance with a sixth preferred embodiment of the invention.

Turning next to FIG. 5, a multiple operating room system 170 in accordance with another embodiment of the invention is shown for providing surgical task lighting in multiple operating rooms 10, 11 in combination with ambient lighting being provided by standard incandescent light members. As illustrated, a single lighting center 42 including at least one electrodeless metal halide discharge lamp 44 is disposed within the ceiling 22 above the operating rooms 10, 11. The system shown in FIG. 5 is substantially similar to that illustrated in FIGS. 3 and 4 except that ambient lighting is provided by a set of standard incandescent ambient light fixtures 172–178.

The first operating room 10 includes a surgical ceiling light array 180 generally of the type described above in connection with FIG. 3. Similarly, the second operating room 11 includes a second surgical ceiling light array 182. Each of the lighting arrays 180, 182 performs and functions in a manner substantially as described above in connection with the light array 122 described above in connection with FIG. 3. Each of the light arrays in the multiple operating room system 170 shown in FIG. 5 is connected to a single central lighting center 42 using a respective set of optical fiber bundles 184, 186. The optical fiber bundles distribute the high quality light power from the EMH source 44 contained within the central lighting center 42 through the ceiling 22 of the operating rooms.

One advantage of the system 170 illustrated in FIG. 5 is that traditional ambient lighting is provided by standard ambient light fixtures 172–178 and is used in conjunction with the high quality light generated from the EMH lighting source within the lighting center 42.

Figure 6:
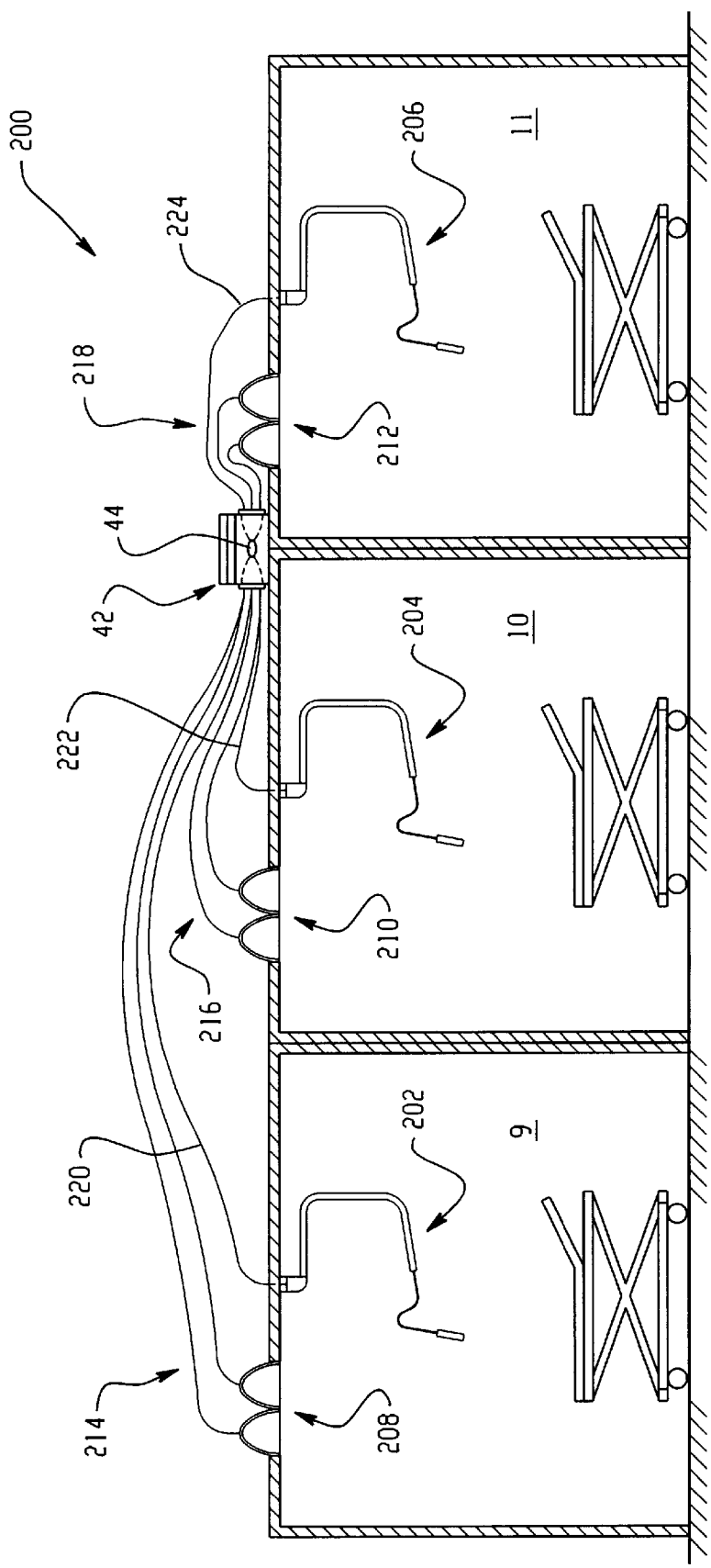

FIG. 6 illustrates an ambient and task lighting system 200 formed in accordance with another embodiment of the invention to provide ambient and task lighting illumination of multiple examination, emergency, intensive care, or critical care rooms using single remote EMH lighting source. As illustrated, a single EMH source 44 to distribute high quality light to multiple emergency, intensive care, or critical care rooms 9, 10, and 11. As shown, each of the rooms 9, 10, and 11 include a ceiling supported task light system 202, 204, 206 and a set of ambient light fixtures 208, 210, 212. Each of the task light systems 202, 204, and 206 are formed and operate substantially in the manner described above in connection with the ceiling supported task light system 100 shown in FIG. 2.

With continued reference to FIG. 6, each of the ambient light fixtures 208, 210, and 212 are connected to the lighting center 42 using a corresponding set of optical fiber cable bundles 214, 216, and 218 as shown. Similarly, each of the task light systems 202, 204, and 206 are connected to the lighting center 42 using a single optical fiber 220, 222, 224. In that way, the high quality light energy generated by the EMH lamp 44 contained within the lighting center 42 can be distributed from overhead to the multiple emergency, intensive care, or critical care rooms 9, 10, and 11.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An illumination system for use during a surgical procedure performed at a surgical site in an operating room, the illumination system comprising:

a single lighting center disposed at a location removed from said medical operating room, the single lighting center including a light source located within a housing;

a plurality of fiber optic light conductors extending from said single lighting center, each of the plurality of fiber optic light conductors having a distal end spaced apart from the lighting center and a proximal end held relative to said housing to receive light from said light source for conducting the light towards the distal end;

at least one lighthead within said medical operating room, the at least one lighthead being adapted to direct light emitted from a distal end of a first fiber optic light conductor of said plurality of fiber optic light conductors towards said surgical site within said operating room; and, at least one light utility outlet disposed within said operating room, the at least one light utility outlet carrying a light emitting distal end of a second fiber optic light conductor of said plurality of fiber optic light conductors and including a mechanical attachment interface for selective mechanical connection to an associated light consuming medical accessory used during said surgical procedure.

2. The illumination system according to claim 1 wherein said light source is a metal halide lamp.

3. The illumination system according to claim 2 wherein:

said light source is an electrodeless metal halide lamp; and, said lighting center is disposed above a ceiling of said operating room.

4. The illumination system according to claim 3 wherein:

said at least one lighthead includes a plurality of surgical lightheads disposed within said medical operating room, each of said plurality of lightheads being adapted to direct light emitted from distal ends of first ones of said plurality of fiber optic light conductors towards said surgical site within said operating room; and, said at least one light utility outlet includes a plurality of wall mounted light utility outlets located on walls of said operating room, each of the plurality of utility outlets receiving a light emitting distal end of second ones of said plurality of fiber optic light conductors and including a mechanical attachment interface for selective optical and mechanical connection to an associated light consuming medical accessory used during said surgical procedure.

5. The illumination system according to claim 3 further including:

a surgical task light system disposed within said medical operating room, the surgical task light system having an elongate support arm with a flexible end carrying a distal end of a third fiber optic light conductor of said plurality of fiber optic light conductors and being adapted for manual manipulation into a plurality of positions relative to said operating room for directing light emitted from the distal end of the third fiber optic light conductor towards said surgical site within said operating room.

6. The illumination system according to claim 5 wherein said at least one lighthead includes a manual zoom lens carried on said flexible end for shaping light emitted from said surgical task light system into a range of selected patterns.

7. An illumination system for use during a surgical procedure performed at a surgical site in an operating room to provide both ambient lighting and task lighting withing said operating room, the illumination system comprising:

a single lighting center disposed at a location removed from said medical operating room, the single lighting center including a light source located within a housing;

a plurality of fiber optic light conductors extending from said single lighting center, each of the plurality of fiber optic light conductors having a distal end spaced apart from the lighting center and a proximal end held relative to said housing to receive light from said light source for conducting the light towards the distal end;

a light array within the operating room, the light array including a set of lighting modules disposed in a substantially regular array within a fixture, each of the lighting modules of said set of lighting modules carrying a distal end of at least one fiber optic light conductor of said plurality of fiber optic light conductors to direct light emitted from said distal ends of said fiber optic light conductors towards said surgical site within the operating room to provide task lighting within said operating room; and, an ambient light member in said operating room, the ambient light member including a set of ambient light fixtures each carrying a distal end of at least one fiber optic light conductor of said plurality of fiber optic light conductors to direct light emitted from said distal ends to within said operating room to provide ambient lighting within said operating room.

8. The illumination system according to claim 7 wherein:
said light source is an electrodeless metal halide lamp; and,
said lighting center is disposed above a ceiling of said operating room.

9. The illumination system according to claim 7 wherein each lighting module of said set of lighting modules is independently movable to focus said light emitted from said distal ends of said fiber optic light conductors to provide a focused light pattern on said surgical site within the operating room.

10. The illumination system according to claim 9 wherein:

each of said lighting modules of said set of lighting modules is independently movable in response to a signal received from an operatively associated external source to provide a controlled pattern of light directed towards said surgical site within the operating room; and, said ambient light member is mounted to a ceiling of the operating room.

11. An illumination system for use during surgical procedures performed at a plurality of surgical sites in a plurality of operating rooms to provide both ambient and task lighting withing said operating rooms, the illumination system comprising:

a single lighting center disposed at a location removed from said medical operating rooms, the single lighting center including a light source located within a housing;

a plurality of fiber optic light conductors extending from said single lighting center, each of the plurality of fiber optic light conductors having a distal end spaced apart from the lighting center and a proximal end held relative to said housing to receive light from said light source for conducting the light towards the distal end;

a first light array within a first operating room, the first light array including a first set of lighting modules disposed in a substantially regular array within a first fixture, each of the lighting modules of said first set of lighting modules carrying a distal end at least one fiber optic light conductor of said plurality of fiber optic light conductors to direct light emitted from said distal ends of said fiber optic light conductors towards a first surgical site within the first operating room;

a second light array within a second operating room, the second light array including a second set of lighting modules disposed in a substantially regular array within a second fixture, each of the lighting modules of said second set of lighting modules carrying a distal end at least one fiber optic light conductor of said plurality of fiber optic light conductors to direct light emitted from said distal ends of said fiber optic light conductors towards a second surgical site within the first operating room;

a first ambient light member in said first operating room, the first ambient light member including a first set of ambient light fixtures each carrying a distal end of at least one fiber optic light conductor of said plurality of fiber optic light conductors to direct light emitted from said distal ends to within said first operating room to provide ambient lighting within said first operating room; and, a second ambient light member in said second operating room, the second ambient light member including a second set of ambient light fixtures each carrying a distal end of at least one fiber optic light conductor of said plurality of fiber optic light conductors to direct light emitted from said distal ends to within said second operating room to provide ambient lighting within said second operating room.

12. The illumination system according to claim 11 wherein said light source is an electrodeless metal halide lamp.

13. The illumination system according to claim 11 wherein each lighting module of said first and second sets of lighting modules is independently movable to focus said light emitted from said distal ends of said fiber optic light conductors to provide a focused light pattern on said first and second surgical sites within the first and second operating rooms, respectively.

14. The illumination system according to claim 13 wherein:

each of said lighting modules of said first and second sets of lighting modules is independently movable to provide a controlled pattern of light directed towards said first and second surgical sites within the first and second operating rooms respectively; and, each ambient light fixture of said first and second ambient light members is mounted to a respective ceiling of the first and second operating rooms.

15. An illumination system for use during a medical procedure performed at an examination site in an examination room to provide both ambient lighting and task lighting, the illumination system comprising:

a lighting center disposed at a location removed from said examination room, the single lighting center including a light source located within a housing;

a plurality of fiber optic light conductors extending from said single lighting center for receiving light from the lighting center into a proximal end and emitting light from a distal end;

a surgical task light system disposed within said examination room, the surgical task light system having an elongate support arm with a flexible end carrying a distal end of a first fiber optic light conductor of said plurality of fiber optic light conductors and being adapted for manual manipulation into a plurality of positions relative to said examination room for directing light emitted from the distal end of the first fiber optic light conductor towards said examination site to provide task lighting within said examination room; and, an ambient light member in a ceiling of said examination room, the ambient light member including a set of ambient light fixtures, each of the ambient light fixtures carrying a distal end of at least one fiber optic light conductor of said plurality of fiber optic light conductors to direct light emitted from said distal ends into said examination room to provide ambient lighting.

16. The illumination system according to claim 15 wherein said light source is an electrodeless metal halide lamp.

17. The illumination system according to claim 15 wherein said surgical task light system includes a manual zoom lens carried on said flexible end for shaping light emitted from said surgical task light system into a range of selected patterns.

18. An illumination system for use during medical procedures performed at first and second examination sites in first and second examination rooms to provide both ambient lighting and task lighting, the illumination system comprising:

a single lighting center disposed at a location removed from said first and second examination rooms, the single lighting center including a light source located within a housing;

a plurality of fiber optic light conductors extending from said single lighting center for receiving light from the lighting center into a proximal end and emitting light from a distal end;

a first surgical task light system disposed within said first examination room, the first surgical task light system having a first elongate support arm with a flexible end carrying a distal end of a first fiber optic light conductor and being adapted for manual manipulation into a plurality of positions relative to said first examination room for directing light emitted from the distal end of the first fiber optic light conductor towards said first examination site within said first examination room; and, a second surgical task light system disposed within said second examination room, the second surgical task light system having a second elongate support arm with a flexible end carrying a distal end of a second fiber optic light conductor and being adapted for manual manipulation into a plurality of positions relative to said second examination room for directing light emitted from the distal end of the second fiber optic light conductor towards said second examination site within said second examination room; and, a first ambient light member in a ceiling of said first examination room, the first ambient light member including a first set of ambient light fixtures, each of the first ambient light fixtures carrying a distal end of at least one fiber optic light conductor of said plurality of fiber optic light conductors to direct light emitted from said distal ends into said first examination room to provide ambient lighting; and, a second ambient light member in a ceiling of said second examination room, the second ambient light member including a second set of ambient light fixtures, each of the second ambient light fixtures carrying a distal end of at least one fiber optic light conductor of said plurality of fiber optic light conductors to direct light emitted from said distal ends into said second examination room to provide ambient lighting.

19. The illumination system according to claim 18 wherein said light source is an electrodeless metal halide lamp having characteristics:

Lamp Life: >5000 hrs.;

Color Rendering Index: >90;

Color Stability: Excellent;

Lamp-to-Lamp Color Variability: ±200 k; and,

Color Temperature: 4500–6000 k.

20. The illumination system according to claim 18 wherein each of said first and second surgical task light systems include a manual zoom lens carried on each said respective flexible end for shaping light emitted from each said surgical task light system into a range of selected patterns.

* * * * *